United States Patent
Meth et al.

[11] 3,892,510
[45] July 1, 1975

[54] TOY EXTRUDER

[75] Inventors: Harry Meth; Allen A. Greenberg, both of Cincinnati, Ohio

[73] Assignee: General Mills Fun Group, Inc., Minneapolis, Minn.

[22] Filed: Aug. 16, 1973

[21] Appl. No.: 388,879

Related U.S. Application Data

[60] Continuation of Ser. No. 167,860, July 30, 1971, abandoned, which is a division of Ser. No. 2,126, Jan. 12, 1970, Pat. No. 3,685,936.

[52] U.S. Cl. ......... 425/173; 425/192; 425/DIG. 57; 425/252; 249/55
[51] Int. Cl. .............................................. B29f 1/06
[58] Field of Search .... 425/190, 192, 242, DIG. 57, 425/812, 252, 173; 249/55

[56] References Cited
UNITED STATES PATENTS

| | | | |
|---|---|---|---|
| 409,734 | 8/1889 | Criley | 425/242 |
| 541,529 | 6/1895 | Genese | 425/242 |
| 580,021 | 4/1897 | Trusler | 425/242 |
| 768,244 | 8/1904 | Stokes | 425/242 |
| 1,507,303 | 9/1924 | Applebaum | 425/242 |
| 2,555,476 | 6/1951 | Du Bois et al. | 425/190 X |
| 2,578,105 | 12/1951 | Taylor | 425/DIG. 57 |
| 3,024,720 | 3/1962 | Welsh | 425/153 X |
| 3,154,811 | 11/1964 | Gardener | 425/242 |
| 3,157,933 | 11/1964 | Boggild et al. | 425/190 |
| 3,574,897 | 4/1971 | Citron et al. | 425/173 X |
| 3,590,749 | 7/1971 | Burns | 425/DIG. 57 |

*Primary Examiner*—Francis S. Husar
*Assistant Examiner*—David S. Safran
*Attorney, Agent, or Firm*—L. MeRoy Lillehaugen

[57] ABSTRACT

A toy extruder which includes a chamber having a movable plunger therein for forcing a soft moldable material out of the chamber into a mold detachably secured to the extruder. A handle member is pivotally connected to the extruder in such a manner that it engages a portion of the plunger so as to impart relative movement to the plunger and force the material out of the chamber into the mold. A molded object is thus formed by separating the mold from the extruder after it has been completely filled with the material, and removing the mold from the object.

4 Claims, 16 Drawing Figures

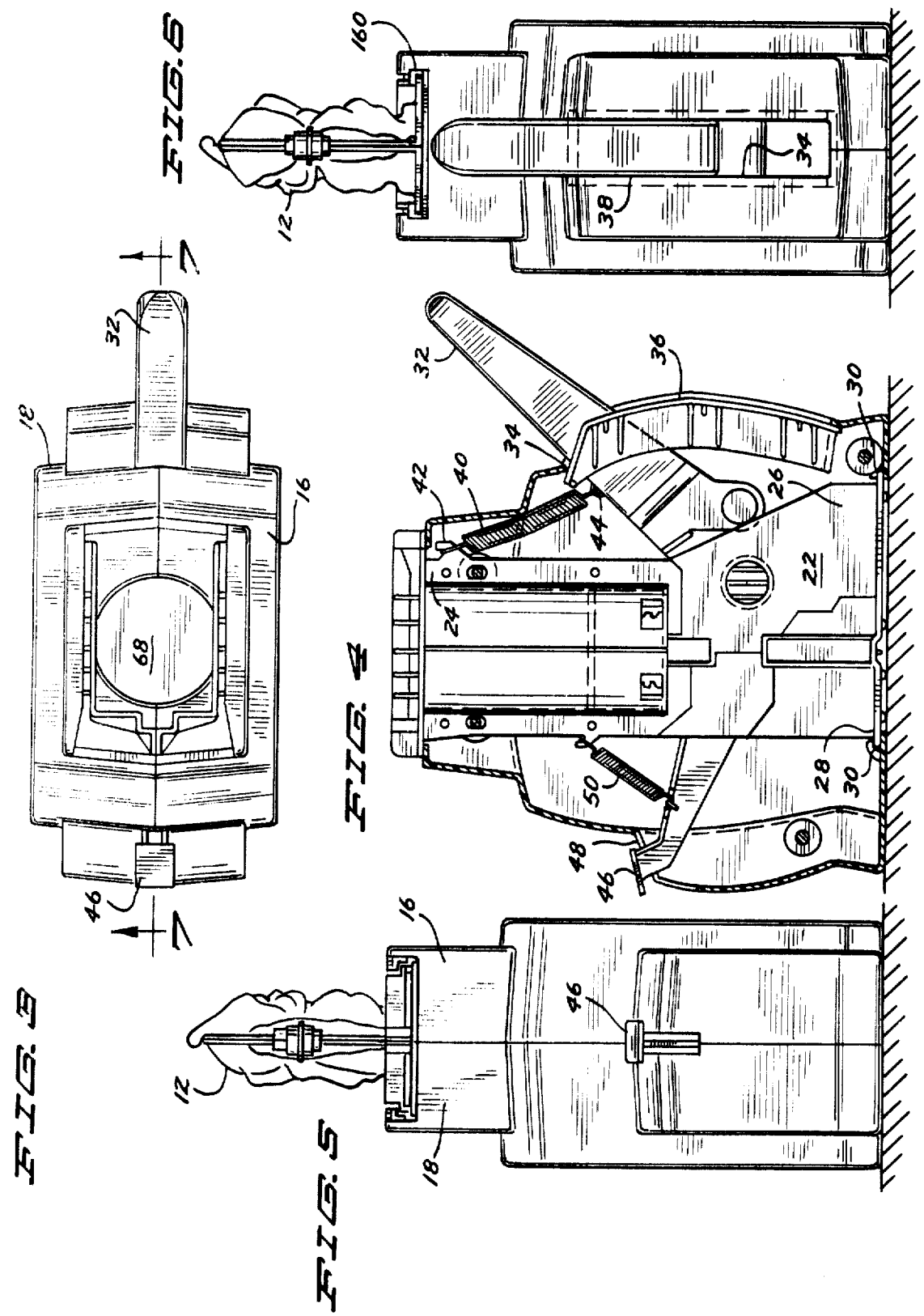

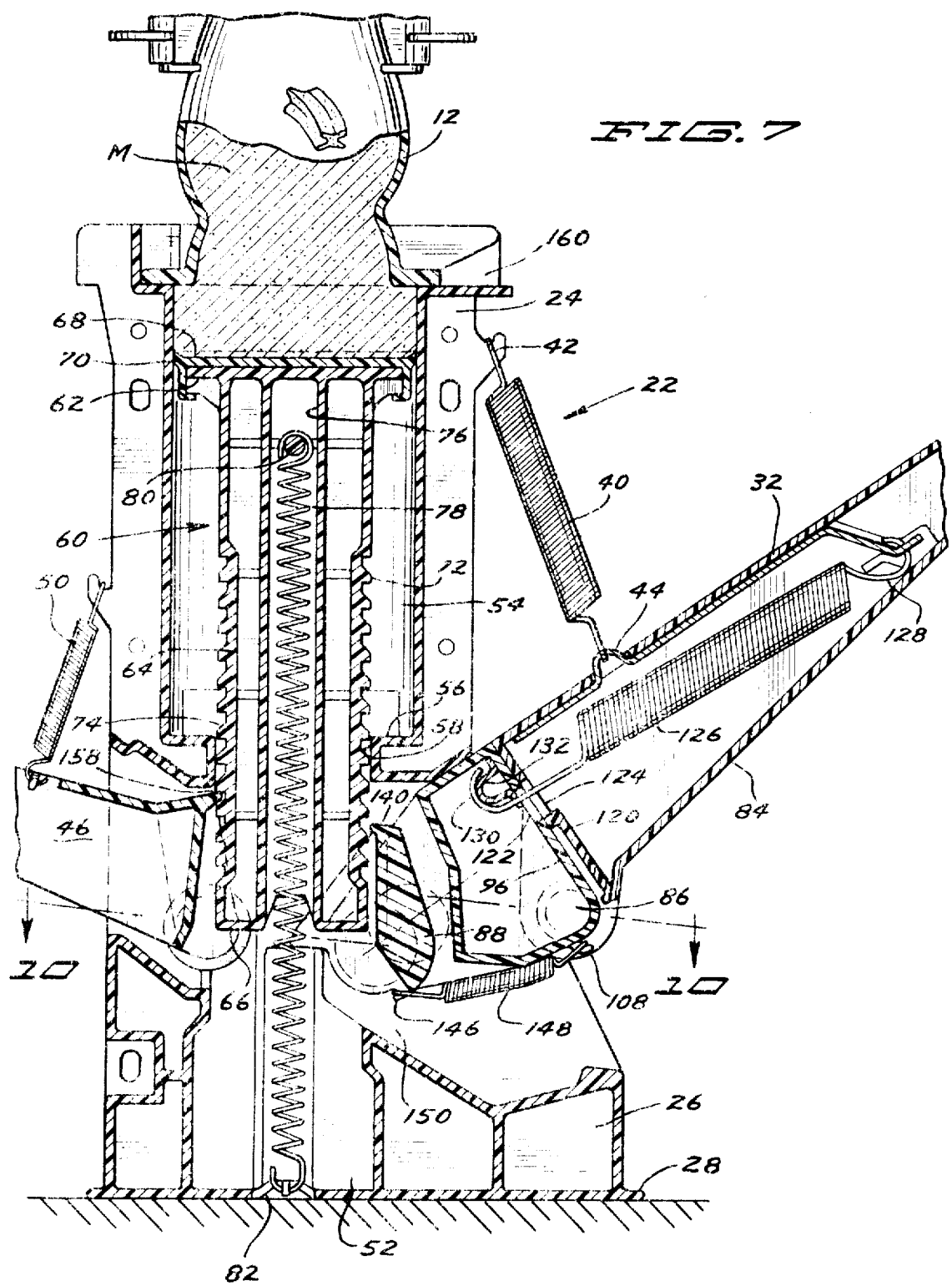

3,892,510

SHEET 5

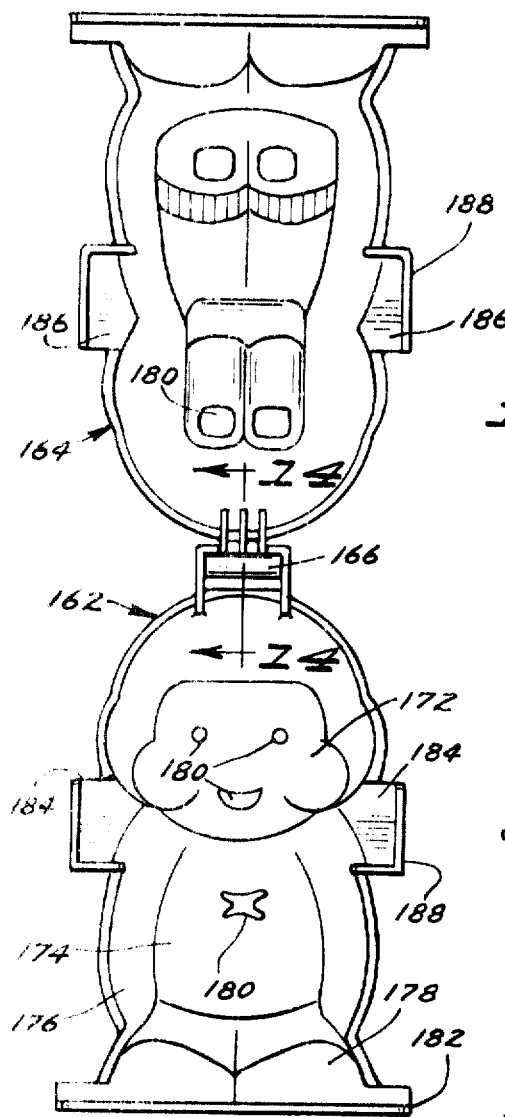
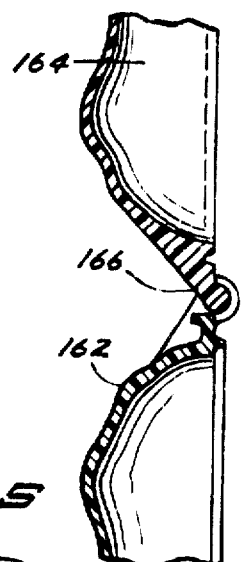
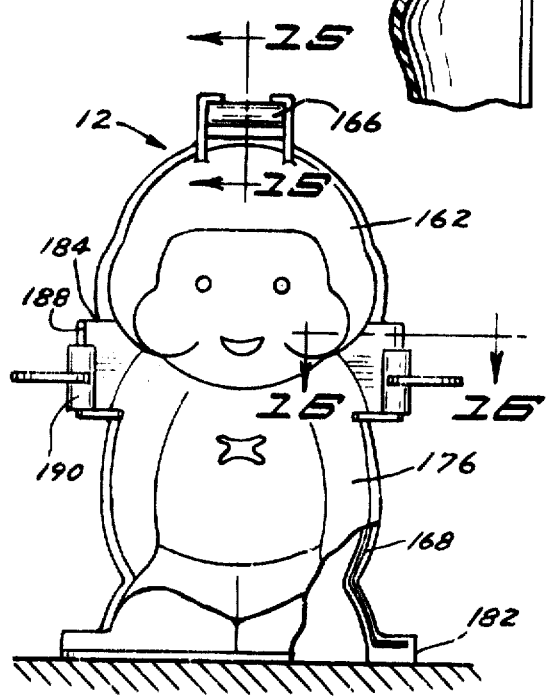
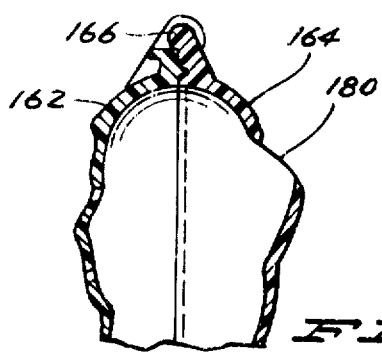
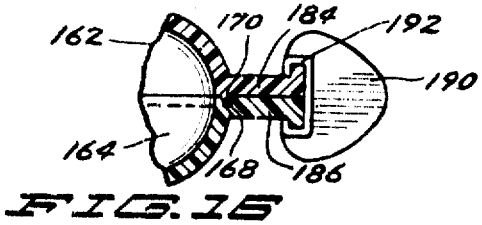

TOY EXTRUDER

This is a continuation of application Ser. No. 167,860, filed July 30, 1971, now abandoned which is a division of application Ser. No. 002,126 filed Jan. 12, 1970, which issued as Patent No. 3,685,936 on Aug. 22, 1972.

The present invention relates to toys and more particularly to a toy extruder for forcing or expelling a moldable material from an extrusion device into a mold having a prescribed size and shape.

As known to those in the art, a variety of toys have been devised for molding a modeling compound, such as clay or other similar material, into a desired configuration. In one such typical toy, a quantity of a moldable material is placed between a pair of die members which are then forced or pressed together so that the excess material exudes between the die members. A three dimensional molded figure is thus formed having substantially the same size and shape as the die members. In one type of extrusion toy, the modeling compound is placed within a chamber having a movable piston or plunger therein. By manipulating the piston or plunger, the compound is forced or expelled through a die opening having a prescribed size and shape. By changing the size and shape of the die opening, for example by changing the die, extrudates having a variety of configurations can be formed. As known to those skilled in the art, numerous and constant efforts are being made to devise toys which are improvements over, and different from, items commercially available for handling modeling compounds.

Accordingly, one object of the present invention is to provide a new and improved extrusion device for handling a moldable material.

Another object is to provide an improved toy extruder for forming objects having a prescribed configuration, from a moldable material.

A further object is to provide a toy extruder which can be used to form a variety of objects by forcing or injecting a moldable compound into a mold or form having a prescribed size and configuration.

A still further object is to provide a toy extruder which is relatively simple and durable in construction, easy to operate, and having built-in safety features to minimize possible damage to the extruder through misuse.

Another object is to provide a hollow mold having improved features for forming a molded object.

Other objects and advantages of the invention will become apparent from a consideration of the following specification and accompanying drawings. Before proceeding with a detailed description of the invention however, a brief description of it will be presented.

Generally, the invention includes an elongated housing mounted within a facade having an external configuration designed to be attractive to children. A chamber is provided within the housing proximate a first end, and a movable plunger is positioned within the chamber. A portion of the plunger, referred to hereinafter as a rack, projects out of the chamber toward the second end of the housing, and it is provided with a plurality of teeth on its surface. A spring is provided for urging the plunger toward the second end of the housing. A handle member is pivotally connected to the housing and a pawl is operatively connected to one end of the handle in such a manner that it engages the teeth on the rack. A release handle is likewise pivotally connected to the housing and it is provided with a pawl for engaging a second set of teeth on the rack. A hollow mold is detachably secured to the first end of the housing so that its interior communicates with the chamber. A moldable material is forced into the mold from the chamber by manipulating the handle, which causes the plunger to move within the chamber. The release handle prevents the rack from moving toward the second end of the housing, due to the increased tension of the spring as the rack and the plunger move relative to the housing. By actuating the release handle, the rack can be caused to return to its starting position.

FIG. 3 is a top plan view of the invention shown in FIG. 1;

FIG. 4 is a partial sectional view similar to FIG. 2 which illustrates part of the internal structure of the toy extruder;

FIG. 5 is a side elevational view of the device as viewed from the left in FIG. 2;

FIG. 6 is a side elevational view of the device as viewed from the right in FIG. 2;

FIG. 7 is a partial cross-sectional view taken along line 7—7 of FIG. 3, illustrating the inner structure of the toy extruder.

FIG. 12 illustrates a hollow mold which is attachable to the top portion of the toy extruder, in such a condition that it can be filled with a moldable material;

FIG. 13 illustrates the mold in an expanded or open condition;

FIG. 14 is a cross-sectional view taken along line 14—14 of FIG. 13;

FIG. 15 is a partial sectional view taken along line 15—15 of FIG. 11; and

FIG. 16 is a partial sectional view taken along line 16—16 of FIG. 11.

Figure 1:
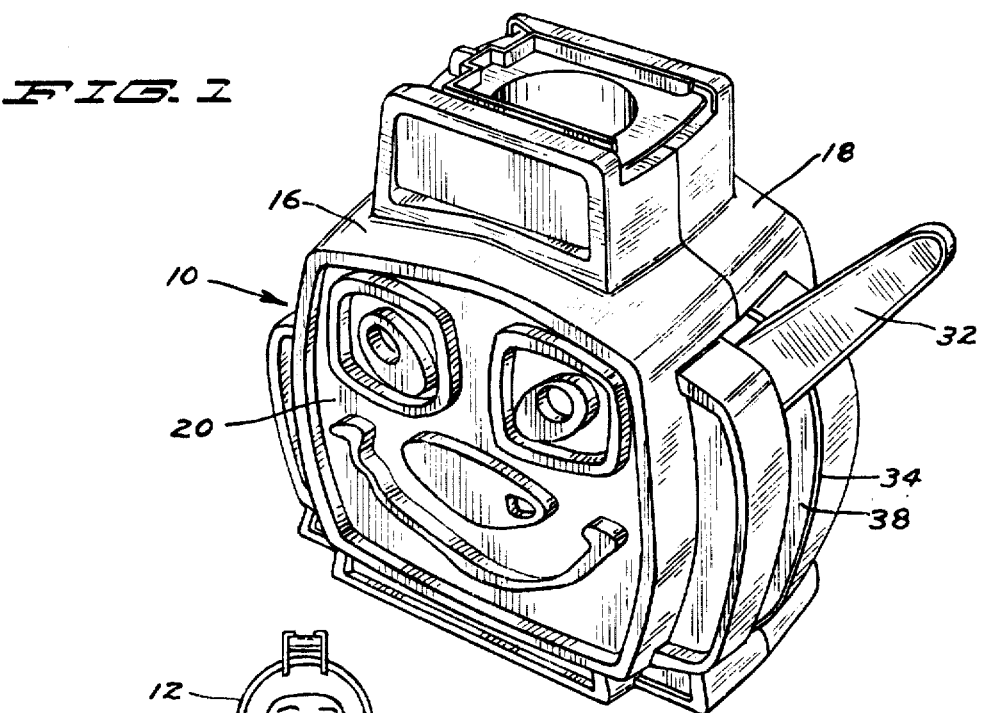
FIG. 1 is a perspective view of a toy extruder embodying the invention.
Figure 2:
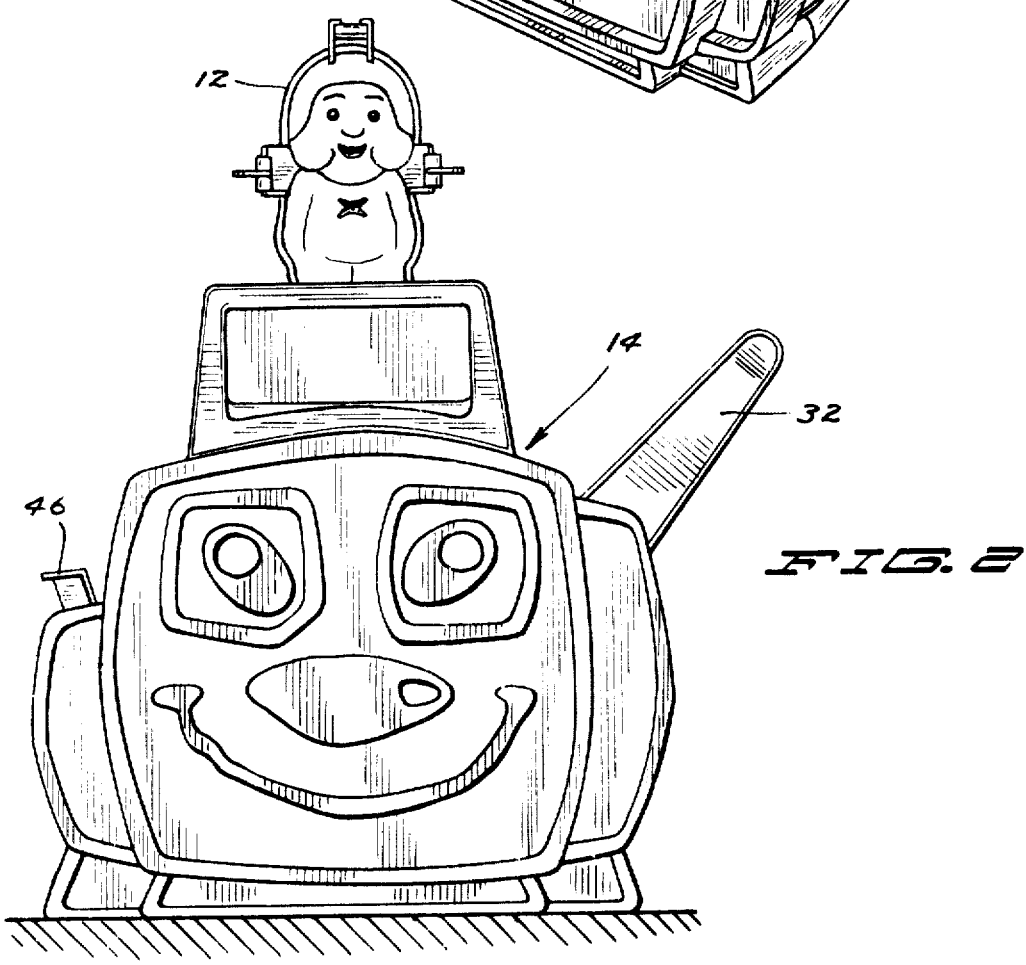
FIG. 2 is a front elevational view of the toy extruder shown in FIG. 1.

FIGS. 1 and 2 illustrate a toy extruder designated generally by reference numeral 10, designed to force or extrude a moldable material such as modeling clay, into a hollow mold designated by numeral 12. The mold 12 is detachably secured to the upper portion of the extruder, and it is designed so that it can readily be removed from the object formed. The toy extruder 10 includes a cover member or facade 14 comprised of a front portion 16 and a back portion 18 which are secured together by appropriate means such as bolts or screws. As illustrated, the front portion 16 is provided with a face 20 designed to create an asthetic appeal to children. The back portion 18 might also be provided with a similar configuration, or if desired, a different design could be provided on the back surface. FIGS. 3, 5 and 6 illustrate the extruder as viewed from different positions, while FIG. 4 shows the extruder 10 having a portion of the facade 14 removed so as to expose the interior of the device, and more particularly, an elongated housing designated generally by numeral 22.

The elongated housing 22 has a first or top end 24, and a second or base end 26 which forms the bottom of the housing. The base end 26 is provided with a flange 28 which cooperates with rabbets 30 in the facade 14, to fit firmly within the facade when in assembled condition. An actuating handle member 32 is pivotally connected to a first side of the housing 20, and it projects through an elongated opening 34 in the facade 14. A sleeve member 36 having an elongated opening or slot 38 therein fits within the opening 34 in such a manner that it surrounds the handle 32 and the handle can move within the slot 38. The sleeve 36 is retained in a fixed position when the facade 14 is in an assembled condition by appropriate means, such as rabbets, or the like. A first end of a spring 40 is attached to the housing at 42, and its second end is attached to the handle at 44; this spring biases or urges the handle in an upward, or counterclockwise, direction. A release handle 46 is pivotally connected to a second side of the housing 22, and it projects through an opening 48 in the facade 14. A spring 50, attached at its ends to the housing and the handle, urges the release handle in an upward or clockwise direction.

FIGS. 7-11 illustrate the extruder in greater detail. For purposes of clarity, the housing 22 has been removed from the facade 14 so as to expose the housing in detail. The housing 22 is provided with a passage or bore designated generally by numeral 52, which extends from the top end 24 of the housing to the base end 26. A piston chamber 54 is formed proximate the top end 24, and it is provided with a bottom wall 56 having an opening 58 therein, which corresponds in size with the passage 52 at that particular location. A movable plunger 60 is positioned within the passage 52 and it includes a piston member 62 which forms a first end of the plunger, and an elongate rack 64 which terminates at a second end 66 of the plunger. A cap 68 is removably attached to the piston member 62 and it has substantially the same cross-sectional size and shape as the piston chamber 54. As depicted in FIG. 7, the cap 68 has a somewhat raised edge or lip 70 which contacts the inner surface of the chamber 54, so as to prevent any material from passing between the cap and the chamber wall.

The rack 64 has a generally rectangular cross-sectional shape and it projects through the opening 58 toward the base end 26 of the housing. A first set of teeth 72 are formed on a first surface of the rack, and a second set of teeth 74 are formed on a second surface of the rack. An elongate channel 76 is formed within the plunger 60 which extends from the end 66 toward the piston member 62. A spring 78 is positioned within the channel 76 and it is attached at its first end to transverse a pin 80 inside the plunger proximate the piston member, and at its second end to the base of the housing at 82. The spring 78 tends to urge or bias the plunger toward the base end of the housing.

The handle member 32 is provided for causing the plunger 60, and more particularly the piston member 62, to move within the piston chamber 54 against the biasing action of the spring 78. In general, the handle member 32 includes an elongated handle portion 84, a pawl housing 86, and a pawl member 88; in this regard, note FIGS. 10 and 11 which illustrate the handle member in greater detail. The pawl housing 86 is formed in the shape of a yoke, having a pair of spaced apart end pieces or arms 90 and 92 separated by a relatively narrow top surface 94, a back surface 96, a front surface 98, and a somewhat curved bottom surface 100. A circular bearing surface or shoulder 102 is formed on the outer surface of each of the end pieces 90 and 92, proximate the wall 96. In addition, a circular recess 104 is formed on the outer surface of each end piece by means of an annular ridge 105, and a circular recess 106 is formed on the inner surface of each of the end pieces 90 and 92. A hook 108 is integrally connected to the bottom surface 100. The housing 22 is provided with a pair of circular bearing surfaces 110 and the pawl housing 86 is pivotally connected to the housing by positioning the bearing surfaces 110 in the recesses 104 formed in the end pieces 90 and 92.

The handle portion 84 includes a front surface 120 and a pair of spaced apart arms 112 and 114 which form a yoke-like configuration; as illustrated, the arms have circular openings 116 and 118 therein. The handle portion 84 is pivotally connected to the pawl housing 86 by inserting the bearing surfaces 102 into the openings 116 and 118. In assembled relationship, the front end surface 120 is positioned adjacent to the back plate 96 of the pawl housing.

A slot 122 is formed in the back surface 96 of the pawl housing, and a similar slot 124 is formed in the front end surface 120 of the handle portion 84. A spring 126 is positioned within the handle portion 84, and its first end is fastened to the handle at 128. The second end of the spring 130 projects through the slots 122 and 124 and engages an insert 132 positioned within the pawl housing. The spring 126 thus urges the handle portion 84 and the pawl housing 86 toward each other so that the surfaces 96 and 120 contact each other.

The pawl 88 is formed as having a pair of spaced apart end pieces or arms 134 and 136, which are separated by a narrow top surface 138 having a front edge 140, and a somewhat curved back surface 142. A projecting shoulder or bearing surface 144 is formed on each end piece, and a hook 146 is integrally connected to the surface 140. The pawl is pivotally connected to the pawl housing by positioning the bearing surfaces 144 in the recesses 106. A spring 148 is attached at its ends to the hooks 108 and 146, and it tends to impart a counterrotational force to the pawl 88 when the pawl is pivotally connected to the pawl housing 86.

As viewed in FIG. 7, when the handle member 32 is in assembled relationship with respect to the housing 22, the arms 134 and 136 of the pawl 88 straddle the rack 64 and the entire unit projects through an opening 150 in the rack housing so that the front edge 140 of the pawl engages the first set of teeth 72 on the rack. The spring 148 urges the pawl into engagement with the rack teeth.

The release handle 46 is also shaped in the form of a yoke having a pair of spaced apart arm members 152 which straddle the rack 64. Each arm member 152 is provided with a circular bearing surface 154 designed to fit within circular recesses 156 in the housing 22 proximate the rack. The upper front edge 158 engages the second set of teeth 74 on the rack when the release handle 46 is pivotally connected to the housing 22, and the spring 50 urges the handle in a clockwise direction thus causing the edge 158 to contact and engage the rack teeth 74.

As pointed out hereinbefore, the mold 12 is detachably secured to the top end 24 of the housing 22. A rabbet 160 is formed in the upper end of the housing to receive and support the hollow mold in such a manner that its interior communicates with the piston chamber 54; in this regard note FIGS. 3-6.

FIGS. 12-16 illustrate the mold 12 in greater detail. At this point it might be pointed out that numerous shapes and sizes of the mold are envisioned, the present drawings merely illustrate one form of the mold which has been used with the extruder 10. The hollow mold 12 is comprised of a front part or portion 162, and a back part or portion 164 which is hingedly connected to the front portion by a hinge 166. Generally, the mold has a head 172, a body 174, arms 176, and feet 178. One or more openings 180 are provided in the mold, and a flange 182 surrounds the feet 178. The flange 182 is dimensioned so that it slidably fits within the rabbet 160 in the top of the housing 22.

The back portion 164 is formed with a groove 168 which extends around most of the edge of the mold, and the front portion 162 is formed with a corresponding bead 170 which likewise extends around most of the edge of the mold. In this regard, note specifically FIG. 12 which illustrates part of the top portion 162 broken away to show the groove 168 in the back portion 164. The front portion 162 is provided with a pair of bosses 184, and the back portion 164 is provided with a similar pair of bosses 186. Corresponding bosses on each portion mate with each other when the front and back portions are positioned proximate each other. Each boss is provided with a flange 188 along part of its edge, and a clip 190 is provided for gripping the bosses 184 and 186, and more particularly the flanges 188, thus maintaining the mold in a closed condition. The clips 190 are provided with rabbets 192 which slidably engage the flanged bosses 184 and 186.

In operation, the user of the toy extruder 10 selects a mold 12 having a desired configuration. The front and back portions 162 and 164 are pivoted with respect to each other so that the bead 170 is positioned within the groove 168. A clip 190 is attached to the bosses 184 and 186, on each side of the mold, thus maintaining the hollow mold 12 in a closed condition. A quantity of the soft plastic material M, such as modeling compound, is then placed in the piston chamber 54, and the mold 12 is attached to the upper end of the housing by slidably inserting the flange 182 into the rabbet 160, so that the interior of the mold communicates with the piston chamber 54.

Figure 8:
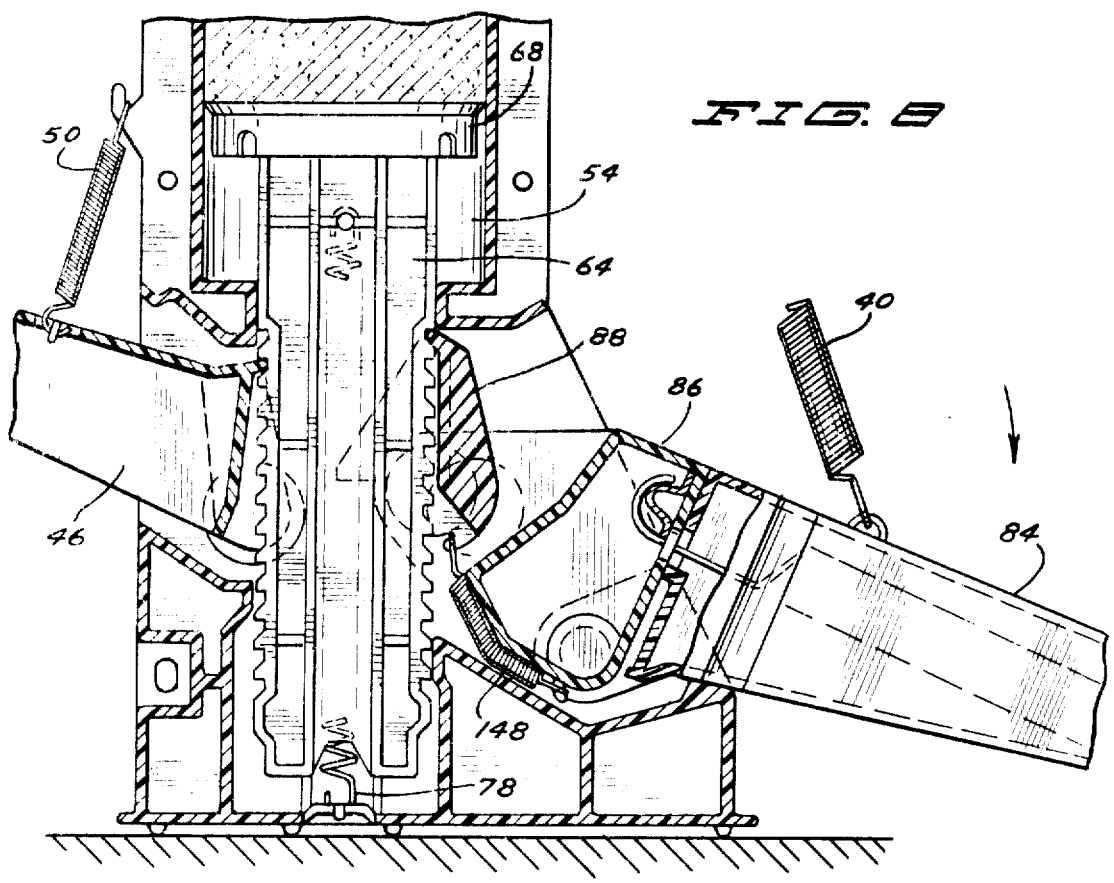
FIG. 8 is a sectional view similar to FIG. 7 but depicting the invention in a different operating condition.
Figure 9:
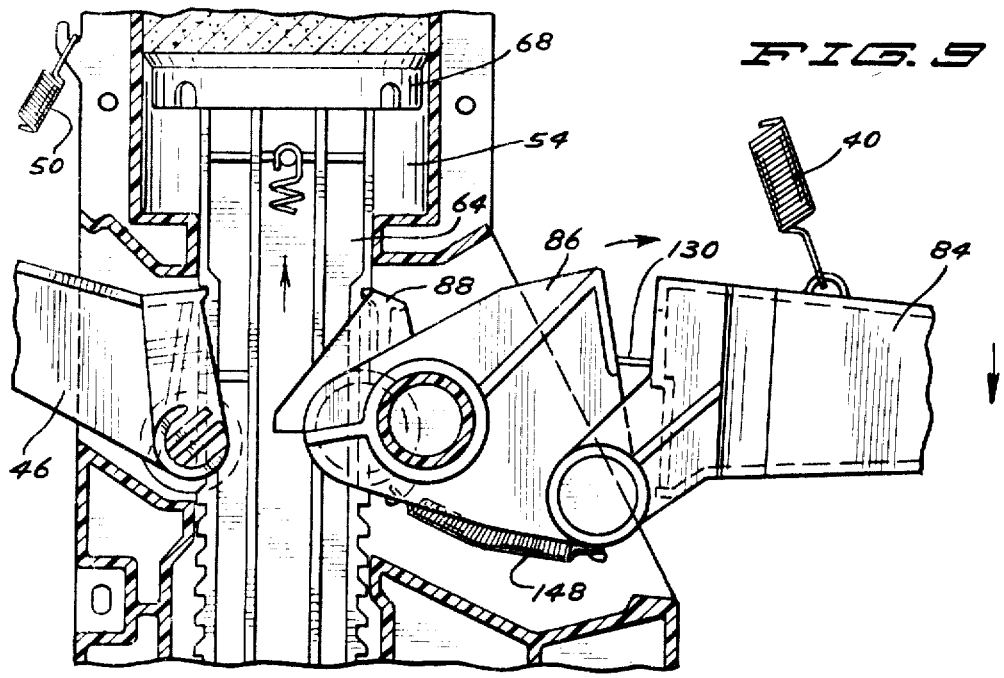
FIG. 9 is a partial cross-sectional view which illustrates the invention in still another operating condition.
Figure 10:
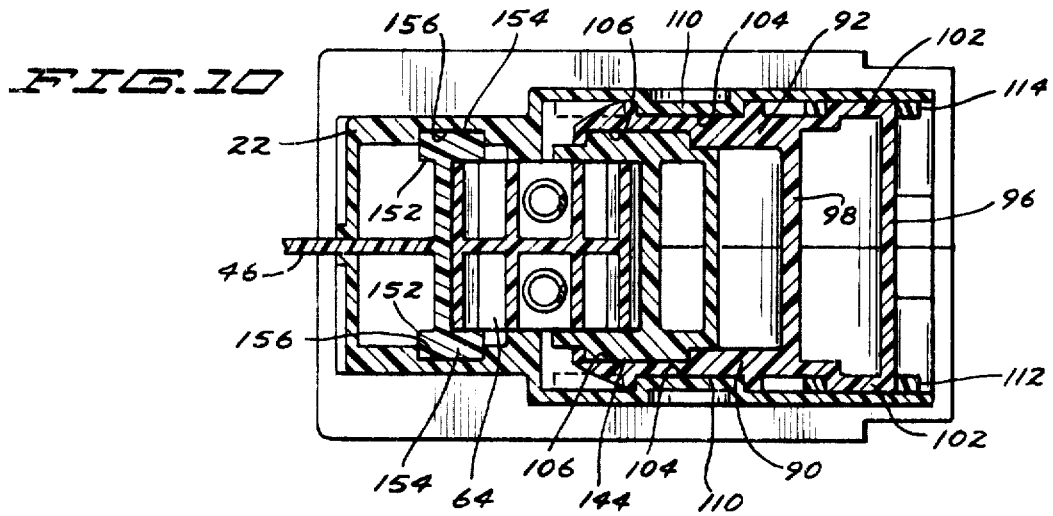
FIG. 10 is a cross-sectional view taken along line 10—10 of FIG. 7.
Figure 11:
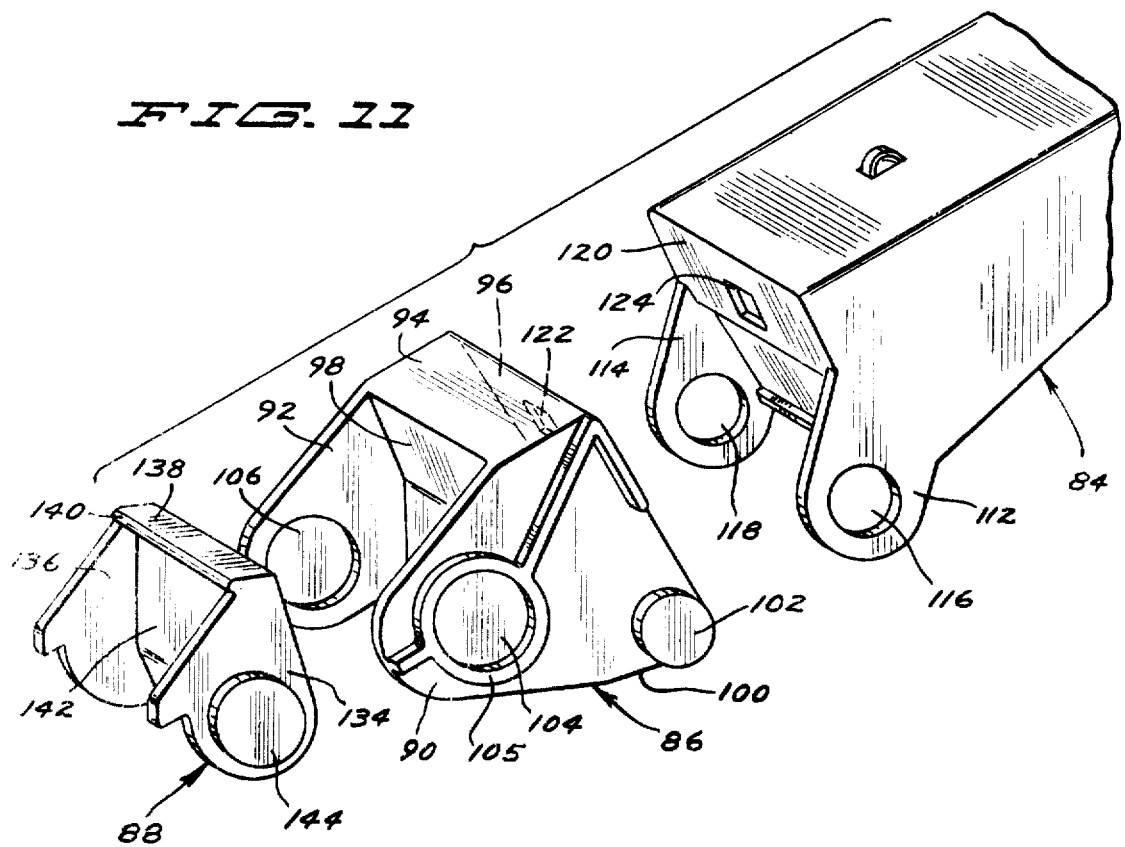
FIG. 11 is an exploded, perspective view which illustrates the handle member of the device.

The handle member 32 is then manipulated by pivoting it relative to the housing 22 at the pivotal connection 104/110. As the handle member 32 pivots in a clockwise direction (as viewed in FIG. 7) against the biasing action of the spring 40, the front edge 140 of the pawl 88 engages the rack teeth 72 and imparts an upward movement to the rack 64 and the piston member 62, against the biasing action of the spring 78. The spring 148 imparts a counter-clockwise force to the pawl 88, thus maintaining the edge 140 in contact with the rack teeth 72. The release handle 46, and more specifically, the front edge 158 of the handle, engages the rack teeth 74, and effectively prevents the rack from moving toward the base of the housing due to the tension of the spring 78. The spring 50 assures proper contact between the rack teeth 74 and the front edge 158. When the handle member 32 is released, the spring 40 urges the handle to its starting position, and the pawl 88 moves in a downward direction, until it engages another tooth on the rack. FIGS. 7 and 8 illustrate the device in two different operating conditions. As shown, in FIG. 8 the piston 62 is positioned proximate the bottom of the piston chamber 54, and the handle member 32 has been pivoted so that it is in its lower-most position. In FIG. 7 on the other hand, the piston 62 has been moved within the chamber 54 so that it is proximate the upper end of the housing, and the handle member 32 is in its upper-most position.

Continuous actuation of the handle 32 incrementally moves the piston member 62 upwardly, thus forcing the modeling material into the mold 12. As the mold becomes filled, the material begins to exude out of the mold through the openings 180, thus assuring that the entire mold is completely filled. Due to the fitting relationship between the groove 168 and the bead 170 around the mold, none of the material exudes out between the front and back portions 162 and 164 when they are locked together.

In the event that relative movement of the piston becomes blocked, for example when the mold 12 is completely filled, undue pressure on the handle member 32 might cause the handle to break. The two-part construction of the handle permits the handle portion 84 to pivot with respect to the pawl housing 86 at the pivot point formed by the bearing surfaces 102 and 104 and the openings 116 and 118, against the biasing action of the spring 126. In this regard, note FIG. 9 which illustrates the handle portion 84 separated somewhat from the pawl housing 86, by pivoting relative to the housing 86. As this pivoting action takes place, the spring 126 within the handle stretches or expands until the force on the handle is relieved.

After the mold 12 has been completely filled with the material M, the mold is removed from the device by sliding it out of the rabbet 160. At this point it might be mentioned that if the mold 12 is quite large, additional material may have to be placed within the piston chamber 54 in order to assure an adequate and proper fill of the mold. This can be readily accomplished by merely removing the mold from the housing and filling additional material into the chamber 54. After the mold 12 has been competely filled, the material which has exuded through the openings 180 is removed from the mold, the clips 190 are removed from the bosses 184 and 186, and the front and back portions 162 and 164 are pivoted relative to each other to expose a molded object having substantially the same shape and size as the mold 12. A variety of molded objects can thus be formed by merely selecting molds having different shapes and sizes.

In the event that some of the material M is still within the piston chamber 54 after the mold 12 has been removed, the material is removed from the chamber, or an additional mold is secured to the housing and it is likewise filled in the same manner. The piston 62 and the rack 64 are returned to their original position by depressing the release handle 46 so that the front edge 158 becomes disengaged from the rack teeth 74. Under such conditions, the tension of the spring 78 causes the rack to return to its original starting position proximate the base of the housing 22.

In the above description and attached drawings, a disclosure of the principles of this invention is presented, together with some of the specific embodiments by which the invention might be carried out.

We claim:

1. A toy extruder comprising an elongated housing having first and second ends and a bore open at said first end, for receiving varying amounts of a material to be extruded, said bore extending from said first end toward said second end, said opening in said first end permitting the material to be readily introduced into said bore, a movable plunger positioned within said bore, the cross-sectional size and shape of said plunger being substantially the same as that of the bore, means for biasing said plunger toward the second end of said housing, a handle member pivotally connected to said housing, a portion of said handle member adapted to engage a portion of the plunger and cause it to move in a first direction toward the first end of said housing in response to pivotal movement of said handle from a starting position in a first direction, releasable means for preventing said plunger from moving toward the second end of the housing as the handle member is pivoted in a second direction and as said handle is positioned in said starting position, a hollow mold having a prescribed shape and configuration, and means proximate the first end of the housing for detachably securing said hollow mold to said housing in such a manner that the interior of said mold communicates with the bore in the housing.

2. The combination of claim 1 wherein said means includes a rabbet formed in the housing at its first end, and said mold includes means insertable within said rabbet.

3. The combination of claim 1 wherein said hollow mold is provided with at least one opening for permitting material forced thereinto to escape therefrom, as said material is forced into the mold.

4. The combination of claim 1 in which said hollow mold is formed of first and second portions, hinge means for connecting said portions together, and at least one removable clip member for gripping a section of the edges of said portions and holding them together.

* * * * *